(12) United States Patent
Seyffert et al.

(10) Patent No.: US 10,227,057 B2
(45) Date of Patent: Mar. 12, 2019

(54) METHOD FOR DETECTING MISUSE OF A SAFETY BELT AND SAFETY BELT SYSTEM

(71) Applicant: TRW AUTOMOTIVE GMBH, Alfdorf (DE)

(72) Inventors: Martin Seyffert, Pfullingen (DE); Karl Birk, Ebersbach (DE)

(73) Assignee: TRW AUTOMOTIVE GmbH (DE)

( * ) Notice: Subject to any disclaimer, the term of this patent is extended or adjusted under 35 U.S.C. 154(b) by 0 days.

(21) Appl. No.: 15/544,539

(22) PCT Filed: Jan. 15, 2016

(86) PCT No.: PCT/EP2016/000068
§ 371 (c)(1),
(2) Date: Jul. 19, 2017

(87) PCT Pub. No.: WO2016/116264
PCT Pub. Date: Jul. 28, 2016

(65) Prior Publication Data
US 2017/0369031 A1    Dec. 28, 2017

(30) Foreign Application Priority Data
Jan. 23, 2015   (DE) .................. 10 2015 000 664

(51) Int. Cl.
*B60Q 1/00* (2006.01)
*B60R 22/48* (2006.01)
*B60R 21/015* (2006.01)

(52) U.S. Cl.
CPC ........ *B60R 22/48* (2013.01); *B60R 21/01566* (2014.10); *B60R 2022/4816* (2013.01);
(Continued)

(58) Field of Classification Search
CPC .... B60R 22/48; B60R 2022/4808–2022/4858; B60R 21/015; B60R 21/01544–21/0155
(Continued)

(56) References Cited

U.S. PATENT DOCUMENTS 3,840,849 A * 10/1974 Lohr .................... B60R 22/48
340/457.1
4,885,566 A * 12/1989 Aoki .................... B60R 22/48
340/457.1
(Continued)

FOREIGN PATENT DOCUMENTS

CN    103057515    4/2013
DE    102009024630    1/2010
(Continued)

*Primary Examiner* — Tai T Nguyen
(74) *Attorney, Agent, or Firm* — Tarolli, Sundheim, Covell & Tummino LLP

(57) ABSTRACT

In a method for identifying misuse of a seat belt in a vehicle, vehicle data are detected and, based on said data, a plausibility check is performed for determining whether the seat belt is fastened as intended. Signals of at least one belt buckle sensor and of at least one webbing extension sensor are detected and a plausibility check for misuse is performed by taking the time course of the signals and/or the point in time of input of the signals into account so as to make a comparison with stored reference data. A seat belt system in a vehicle for carrying out said method comprises at least one belt buckle sensor and at least one webbing extension sensor as well as at least one seat occupation sensor, one door sensor, one vehicle acceleration sensor and/or one vehicle speedometer as well as a control unit in which the signals of the sensors are stored and evaluated.

20 Claims, 5 Drawing Sheets

(52) U.S. Cl.
CPC ............... *B60R 2022/4825* (2013.01); *B60R 2022/4858* (2013.01)

(58) Field of Classification Search
USPC .......................................... 340/457.1; 701/45
See application file for complete search history.

(56) References Cited

U.S. PATENT DOCUMENTS

| | | | | |
|---|---|---|---|---|
| 5,109,199 | A * | 4/1992 | Berger | B60R 22/48 200/61.58 B |
| 8,195,365 | B2 * | 6/2012 | Bernhagen | B60R 22/48 340/457.1 |
| 2005/0039965 | A1 * | 2/2005 | O'Neill | B60R 21/01548 180/268 |
| 2009/0015394 | A1 * | 1/2009 | Specht | B60R 22/48 340/457.1 |
| 2010/0182425 | A1 * | 7/2010 | Sakakida | B60N 2/002 348/135 |
| 2011/0074566 | A1 | 3/2011 | Rao et al. | |
| 2013/0033372 | A1 * | 2/2013 | Medel | B60R 22/48 340/438 |
| 2014/0266663 | A1 * | 9/2014 | Schlaps | B60R 22/48 340/457.1 |
| 2015/0145666 | A1 * | 5/2015 | Sugawara | B60R 22/48 340/457.1 |
| 2015/0251618 | A1 * | 9/2015 | Ghannam | B60R 22/48 340/457.1 |

FOREIGN PATENT DOCUMENTS

| | | |
|---|---|---|
| DE | 102010023491 | 1/2011 |
| EP | 2527213 | 11/2012 |

* cited by examiner

METHOD FOR DETECTING MISUSE OF A SAFETY BELT AND SAFETY BELT SYSTEM

RELATED APPLICATIONS

This application corresponds to PCT/EP2016/000068, filed Jan. 15, 2016, which claims the benefit of German Application No. 10 2015 000 664.9, filed Jan. 23, 2015, the subject matter of which are incorporated herein by reference in their entirety.

BACKGROUND OF THE INVENTION

The invention relates to a method of identifying misuse of a seat belt in a vehicle as well as to a seat belt system of a vehicle.

In various countries it is obligatory to fasten seat belts in passenger cars during driving. In order to draw a passenger's attention to his/her failure of fastening the seat belt, sensors are known for detecting insertion of a plug-in tongue into the belt buckle or else webbing extension from the belt retractor. Unless either of said actions does happen, for example, a warning is output or even the use of the vehicle is inhibited (this is known as SBI or seat belt interlock).

Although the use of the seat belt definitely increases the traffic safety for the vehicle occupant, as is proven, there are repeatedly willful misuses of the seat belt system in which the seat belt is not fastened as intended. For example, the occupant may insert the plug-in tongue into the belt buckle and then sit on the seat belt. In order to bypass the belt buckle sensor, it may also happen that a separate plug-in tongue which is not connected to the webbing is inserted in the belt buckle. The use of such "cheating tongues" is intended to pretend fastening of the belt as intended. The sensor signals atone therefore provide no reliable information about whether or not misuse of the seat belt is given.

SUMMARY OF THE INVENTION

It is the object of the invention to improve the identification of misuse of the seat belt in a simple manner.

In accordance with the invention, a method of identifying misuse of a seat belt in a vehicle is provided in which vehicle data ere detected and by said data a plausibility check is performed for determining whether the seat belt is fastened as intended. Accordingly, signals of at least one belt buckle sensor and at least one webbing extension sensor are detected. A plausibility check for misuse is carried out in that the time course of the signals and/or the time of input of the signals are used so as to make a comparison with deposited reference data. According to the invention, it is thus not only important that the belt buckle sensor and the webbing extension sensor have reported actuation, but in addition further data relating to said sensor signals are detected end said data are additionally considered to check whether the seat belt is used as intended or whether a misuse is given.

Additional data may be obtained, for example, from the point in time of input of the sensor signals. Therefrom, inter alia, a time sequence of the input of the sensor data and thus the hand movements made by the vehicle occupant can be reconstructed.

Moreover, a time course of the signals of a sensor can be defected and evaluated by detecting successive signals of a sensor in their time interval as well as in their feedback values, where appropriate.

It is possible though not necessary to carry out continuous recording in uniform time intervals for the sensors, usually it is sufficient to store only the sensor signals in which the sensor reports a change of condition. In the webbing extension sensor, especially apart from the event "webbing extension", also the length of the extended webbing is detected. Preferably, the webbing extension sensor detects positive and negative webbing extensions, i.e. webbing output as well as webbing retraction. The term "webbing extension" therefore in this application comprises a movement of the webbing in both directions of movement unless expressly a distinction is made.

In order to improve the plausibility check further vehicle date may be used, wherein the vehicle data may include signals of at least one seat occupation sensor and/or signals of a door sensor and/or at least one vehicle acceleration and one vehicle speed, for example. In this case, too, in all sensor signals preferably the point in time of input of the signal as well as, where appropriate, the current value of the signal, for example during acceleration or vehicle speed, is detected and stored.

In general, the plausibility check of whether the seat belt is fastened as intended may comprise a check of whether a plug-in tongue of the seat belt is correctly inserted in an assigned belt buckle as well as whether the webbing is guided as intended, i.e. wound around the upper body part of the vehicle occupant, for example.

The stored sensor signals may be associated with a respective event. An event is considered to be the fact, for example, that the belt buckle sensor reports insertion of the plug-in tongue, the speed sensor reports exceeding of the limit speed for driving without fastening the seat belt, the webbing extension sensor reports webbing retraction of webbing extension, a seat occupation sensor reports seat occupation by a person, an acceleration sensor reports transverse acceleration to the right or left and, resp., vehicle deceleration or vehicle acceleration, or when a door sensor reports that the vehicle door has been opened or closed.

Based on the time of signal input, a time order of events can be established and/or time intervals between the events can be calculated which further permit concluding the actual behavior of the vehicle occupant and, in this way, increase the quality of the plausibility assessment.

When the sensor signal comprises a concrete value, e.g. a concrete webbing extension or a speed value, said value may be considered to be a parameter concerning an event and may be linked therewith. It is not necessary for all events to have a parameter value, for example the door sensor and the belt buckle sensor usually only provide a signal indicating that the door is opened or closed and, resp., the plug-in tongue is inserted or removed, i.e. only values "0" and "1" but no parameters are to be detected.

In an advantageous variant a time order of events is evaluated and compared to a reference order for a plausibility chock of whether the seat belt is fastened as intended. Alternatively or additionally, parameters concerning events may be evaluated and compared to reference parameter values. A reference order may correspond, for example, to a plausible order. Just as well, the reference orders may be set corresponding to misuses, of course. An example of using parameters is the fact, for example, that directly after inserting the plug-in tongue into the belt buckle only small webbing retraction is expected, because after insertion the occupant turns back to the normal seating position, which entails small webbing retraction. If, however, a large retraction up to the parking position of the seat belt is detected with a webbing extension sensor signal directly after the belt buckle signal concerning the event "inserting plug-in tongue", this speaks in favor of the fact that the seat belt has been withdrawn up to its parking position, i.e. a misuse is given using a cheating tongue which is not connected to the webbing, or that the occupant sat down on the belt.

According to this pattern, from the combination of sensor signals, the time order of the sensor signals and, where necessary, of parameters of the sensor signals e plurality of scenarios can be construed each of which can be compared to reference orders or reference parameters and which permit a substantially more accurate evaluation as to whether or not misuse is plausible than the sole consideration of the respective sensor signals.

Preferably, some plausibility inquiries are combined with each other so that only when there are plural results which give reason to doubt the correct webbing use an output signal which may even be an SBI is generated.

The computing effort for evaluation can be reduced, for example, by the fact that only events are taken into account which lie before a predetermined event or a combination of events which serve(s) as a condition. Preferably all signal inputs and thus all events are stored. However, only a predetermined number of events prior to meeting the predetermined condition or only events being in a predetermined time interval prior to meeting the condition are considered for evaluation. A suitable condition is, for example, a combination of a signal of the belt buckle sensor outputting an insertion of the plug-in tongue with a signal of the speedometer that indicates an exceeding of the limit speed for fastening the seat belt.

The signal of the speedometer indicative of an exceeding of the limit speed for fastening the seat belt is output as a standard when said limit speed is exceeded and results in the fact that a reminder signal is generated by the vehicle, usually in the form of a display in the cockpit as well as a sound signal that cannot be switched off.

A possible time sequence of events comprises, e.g., "door opened", "webbing extension", "plug-in tongue inserted". A misuse can be concluded when the chronological order of the detected events deviates from said reference order.

For increasing the accuracy also further vehicle data may be taken into account, however, such as unlocking the vehicle, opening the door, sitting down on the seat in the case of a passenger seat, which data have to precede the webbing extension and the insertion of the plug-in tongue into the belt buckle when the belt is correctly used.

After inserting the plug-in tongue, it can be evaluated whether a small webbing retraction which does not go back to the parking position is given, if the detected event order corresponds to such reference order, it is most probable that a correct use of the seat belt is given. If, however, the plug-in tongue is inserted already along with opening of the door and prior to the webbing extension, for example, it can be assumed that a cheating tongue is used and a webbing extension is pretended. This is especially true when the webbing is withdrawn up to the parking position, i.e. to the stored position of the belt.

Misuse can also be concluded, for instance, from determining that there is no or only small webbing extension when a transverse vehicle acceleration and/or vehicle deceleration is detected, especially when the vehicle acceleration exceeds a reference value for which higher webbing extension could be expected by the movement of the occupant relative to the vehicle, because the upper body part of the occupant would have to move sidewards because of the transverse acceleration.

It is another way of concluding a misuse, when during e speed other than zero over a predetermined period of time the webbing movements that do not correlate with vehicle acceleration events deviate from a reference value. Such webbing movements are based on the vehicle occupants' constantly occurring usual independent movements. For example, a webbing movement of extension and retraction occurs when operating a navigation instrument a car radio, when opening and closing the glove compartment and adjusting the mirror. Plausible values and/or reference values for misuse which are based, for example, on an occupant's sitting on an inserted belt are detected in test runs before and are stored as reference values. Such reference values can also be stored for child safety seats and other objects which are typically placed on the front passenger seat or on the back seat.

The described method can be basically carried out with the data of the belt buckle sensor and the webbing extension sensor only. The quality of evaluation can be improved, however, by using further sensors and further vehicle data.

A seat belt system for carrying out an above-described method comprises at least one belt buckle sensor and at least one webbing extension sensor as wall as at least one seat occupation sensor, one door sensor, one vehicle acceleration sensor and/or one vehicle speedometer. The seat belt system moreover comprises a control unit in which the signals of the sensors are stored and evaluated. It has turned out that by said sensors known per se a definitely improved assessment of misuse of the seat belt can be achieved as compared to the consideration of merely the sensor signals by linking the chronological order of the input of the sensor signals as well as of the evaluation of parameters contained in the sensor signals such as e.g. the webbing extension length or the height of acceleration.

In order to prevent plug-in tongues from being inserted into non-assigned belt buckles or cheating tongues from being used, preferably on at least one plug-in tongue a coding is provided which is exactly adjusted to one single belt buckle of the seat belt system. Such coding may be provided at least for the driver and passenger seats, but it may as well be used on the back seats. Preferably, the coding is designed so that the plug-in tongue only locks in exactly said belt buckle and cannot be correctly inserted into any other belt buckle or that the plug-in tongue is individualized via an RFID tag on the same. In this case, the belt buckle preferably does not report any "plug-in tongue inserted" signal.

The coding is preferably mechanical, for example in a particular geometry of the plug-in tongue, but it might as well be realized in an optical, acoustic or electronic manner.

BRIEF DESCRIPTION OF THE DRAWINGS

Hereinafter the invention shall be described in detail by way of plural embodiments with reference to the enclosed drawings, wherein.

DESCRIPTION

Figure 1:
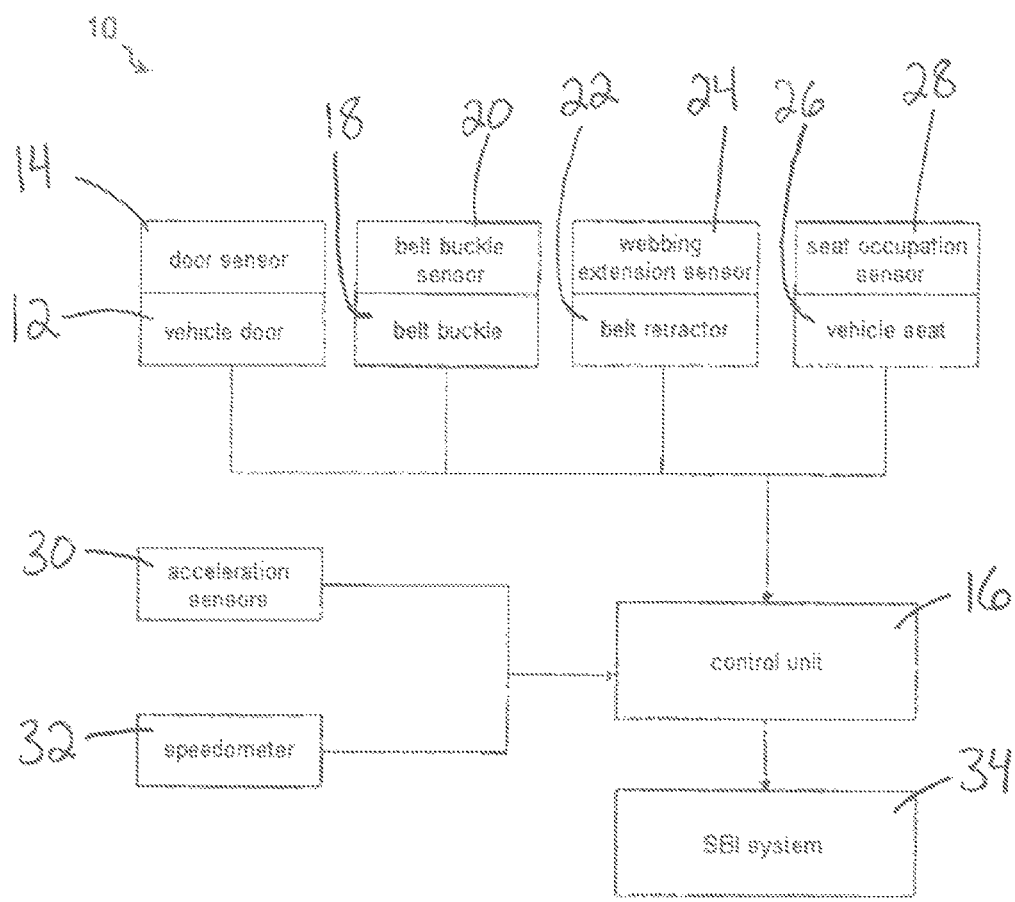
FIG. 1 is a schematic representation of a seat belt system according to the invention for carrying out a method of identifying misuse of a seat belt in a vehicle according to the invention.

FIG. 1 schematically illustrates a seat belt system 10 in which a plurality of vehicle components is connected to sensors adapted to detect a movement a condition or a parameter of the vehicle component.

In this example, inter alia a vehicle door 12 is provided which is connected to a door sensor 14, wherein the door look sensor 14 is capable of detecting opening and closing of the vehicle door 12 and reports the same by a respective signal to a control unit 16.

In the control unit 16 all incoming sensor signals are stored, wherein moreover the point in time of signal input is always stored. An evaluation in which each specific sensor signal is considered to be a separate event is carried out.

The seat belt system 10 further includes plural belt buckles 18 each having a belt buckle sensor 20 (for reasons of representation only one belt buckle is shown). The belt buckle sensor 20 detects insertion and release of a plug-in tongue and reports said signal to the control unit 16. Such "plug-in tongue inserted" signal is output by the belt buckle sensor 20 only when the plug-in tongue is correctly locked in the belt buckle 18.

Furthermore, a belt retractor 22 comprising a webbing extension sensor 24 is provided. The webbing extension sensor 24 records webbing movements, namely both in the positive and in the negative direction of extension. The direction of movement and the length of the respective webbing extension are equally reported to the control unit 16 where they are stored, or appropriate signals are transmitted to the control unit 16 which then determines the direction of movement and the length of the webbing extension effected.

In this example, moreover a vehicle seat 26 comprising a seat occupation sensor 28 is provided, wherein the seat occupation sensor 28 reports to the control unit 16 when the vehicle seat 26 is loaded by a load exceeding a predetermined limit. This, too, is stored in the control unit 16 together with the signal input time. A seat occupation sensor 28 is provided especially for a passenger seat, but it may also be provided for other seats in the vehicle.

Moreover, data from acceleration sensors 30 as well as from a speedometer 32 are detected and are equally reported to the control unit 16. Acceleration signals are noted in the control unit together with the time of signal input. It is possible to take only accelerations above a predetermined limit into account.

The vehicle speed may be continuously detected and recorded, but also in this case it is possible to restrict detection to particular limits. It is especially important to detect exceeding of a limit speed from which fastening of the seat belt is obligatory and from which control instances within the vehicle not shown in detail output a seat belt warning signal. Exceeding of said limit speed is equally stored in the control unit 16 together with the time of signal input.

The control unit 16 is connected to an SBI system 34 which is adapted to inhibit, upon misuse of the seat belt use and movement of the vehicle in total or outputs at least a warning which cannot be switched off.

For detecting misuse, a plausibility check is carried out in the control unit. This means that not merely the sensor signals are considered, especially the signals of the belt buckle sensor 20 as well as of the webbing extension sensor 24, to determine whether the seat belt is fastened as intended, but that further data for estimating whether it is plausible that the seat belt is fastened as intended are taken into account.

In this way, on the one hand, based on the stored point in time of signal input an order of events is calculated illustrating in which time sequence the individual sensor signals have been received and, consequently, in which time sequence the individual events have occurred. Moreover, the time interval between the events can be determined and used for evaluation. Finally, parameters of the individual events, especially a length of webbing extension and acceleration values, may be included in the evaluation.

Checking a misuse comprises two generally different ways. On the one hand, it has to be assessed whether the correct plug-in tongue was inserted in the matching belt buckle and, on the other hand, it has to be assessed whether the webbing is fastened as intended and, resp., guided as intended.

In order to find out whether the correct plug-in tongue was inserted into the matching belt buckle 18, in this case mechanically and/or electronically coded plug-in tongues are used which only fit into one single belt buckle 18 in the vehicle (step S201). Only when said plug-in tongue is inserted in the respective belt buckle 18, does the belt buckle sensor 20 report the "plug-in tongue inserted" signal which is then stored in the control unit 16.

The coding is realized, for example, by a specific geometry on the plug-in tongue which is designed so that only this specific plug-in tongue can be locked in the belt buckle 18. Other types of coding may also be used, of course.

For assuming that the matching plug-in tongue was correctly inserted it is further checked whether the belt belonging to said plug-in tongue is in fact used (step S202). It is checked, for example, whether webbing is extended at all, or furthermore, whether a webbing extension is followed at most by a small webbing retraction but not by a webbing retraction back to the parking position of the seat belt.

Figure 2:
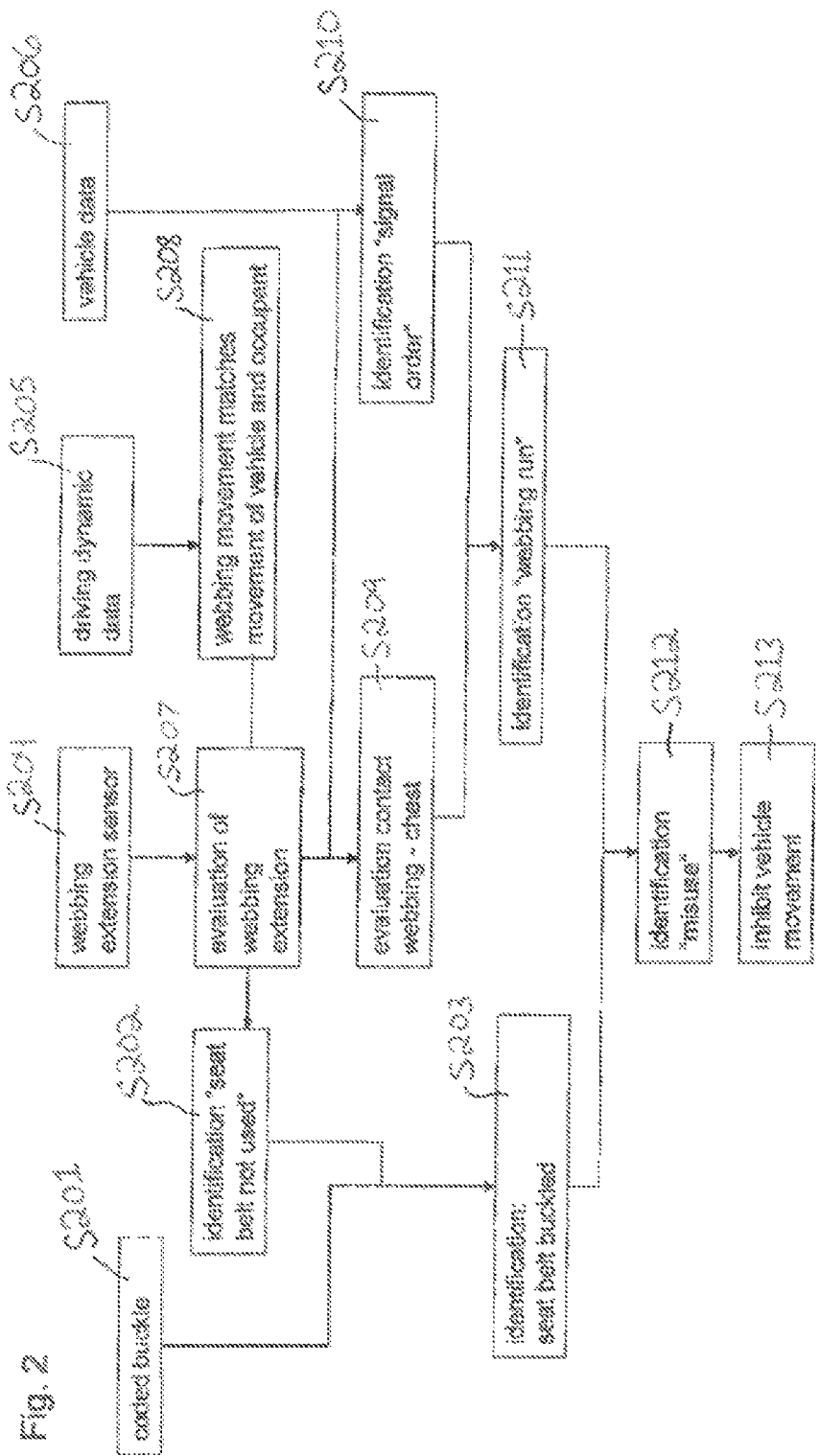
FIG. 2 is a flowchart for identifying misuse of a seat belt in a vehicle based on the assessment of vehicle data.

If both conditions are met, it can be concluded therefrom that the correct belt including the attached plug-in tongue was fixed in the correct belt buckle (step S203) (see FIG. 2).

For identifying whether the webbing is fastened and guided as intended, further vehicle data are taken into account (steps S204, S205 and S206). This branch is illustrated on the right side in FIG. 2. The driving dynamics data listed there constitute a sub-group of the general vehicle data.

Here especially the evaluation of the webbing movement is incorporated, i.e. of the webbing extension and the webbing retraction over time (step S207). Accordingly, it is checked, on the one hand, whether the webbing movements are matching the detected vehicle accelerations (step S208). Moreover, it is checked by way of reference profiles established before and stored in the control unit 16 whether the measured webbing movements are plausible to an occupant movement in the absence of vehicle accelerations (step S208). Hereby operating the car radio or the navigation system, reaching into the glove compartment, shifting in the case of manual gearshift or reaching to the mirror as well as loosening a piece of clothing, for example, are understood. Those movements statistically take place at a certain frequency and entail a respective characteristic webbing extension. When considering the webbing movements which are not correlated with a vehicle acceleration over a particular time, for example several minutes up to one hour, it can thus be detected whether there is a natural webbing movement from which it can be concluded that in fact an occupant has fastened the seat belt or whether there is virtually no or definitely no webbing movement from which it can be concluded that the belt is not fastened around the upper body part (step S209).

There may also be established typical reference profiles for unmoved objects or child safety seats which are fastened on the passenger or back seat and which naturally differ from living persons as to webbing movements that are not correlated with a vehicle acceleration.

Moreover, based on the sensor signals an event order is established by evaluating the signal input time (step S210) which may equally be used to identify whether a belt has in fact been fastened or whether fastening of a seat belt was merely pretended (step S211).

FIG. 2 illustrates that both ways are combined in the plausibility check for identifying misuse (step S212). If misuse is identified, this is transmitted to the SBI system 34 and, where necessary, movement of the vehicle is inhibited or a signal is output to the driver (step S213).

When checking whether the seat belt is correctly buckled, it is also checked whether the plug-in tongue is connected to the webbing or is used as a cheating tongue. While the insertion of a plug-in tongue connected to the webbing is preceded by a webbing extension and possibly a small webbing retraction is following, both steps do not occur when a cheating tongue is inserted. An evaluation of the webbing movement before and after insertion thus is indicative of whether or not the respective webbing is connected to the plug-in tongue.

The webbing extension length, too, can be checked for plausibility. For example, an unused seat belt in its so-called parking position exhibits zero extension length, however this is not compatible, of course, with a signal of the belt buckle sensor indicating that the plug-in tongue is inserted.

When during traveling there are no further webbing movements, this is also indicative of the fact that a cheating tongue is used and the webbing is not connected to the plug-in tongue or that the occupant sits on the extended belt.

The course of action of the vehicle occupant and thus the order of events of the incoming sensor signals normally differ, when the belt is correctly fastened, from the course of action in the case of misuse.

Normal buckling is carried out after unlocking the vehicle, opening the door, taking a seat, by a webbing extension followed by inserting the plug-in tongue into the belt buckle.

When inserting the plug-in tongue without buckling of the occupant, the plug-in tongue normally remains permanently in the belt buckle, similarly to the use of a cheating tongue, and thus permanently generates the belt buckle sensor signal "plug-in tongue inserted", irrespective of the driving condition. This, too, can be considered for identifying misuse. For example, in the case of intended use the plug-in tongue is not yet inserted when the door is opened. If thus signal times of "open door" and "plug-in tongue inserted" coincide or are falling within a very short period of time, this is indicative of misuse.

When a seat occupation sensor is used, it can be identified whether the seat belt was fastened as intended by checking whether an occupant sits down although a plug-in tongue has already been inserted into the belt buckle. This is not compatible with the correct signal order of the occupant first sitting down and then fastening the seat belt.

A complete check of all combinations requires a lot of time and computing capacity. Therefore, only a limited number of sensor signals is used hare for taking a decision. Only sensor signals in a time interval before meeting a specific condition are evaluated and are considered in the plausibility check. This condition is, for example, the combination of the events of "plug-in tongue inserted" and exceeding the limit speed from which the seat belt has to be fastened as supplied by the vehicle speed indicator.

Figure 3:
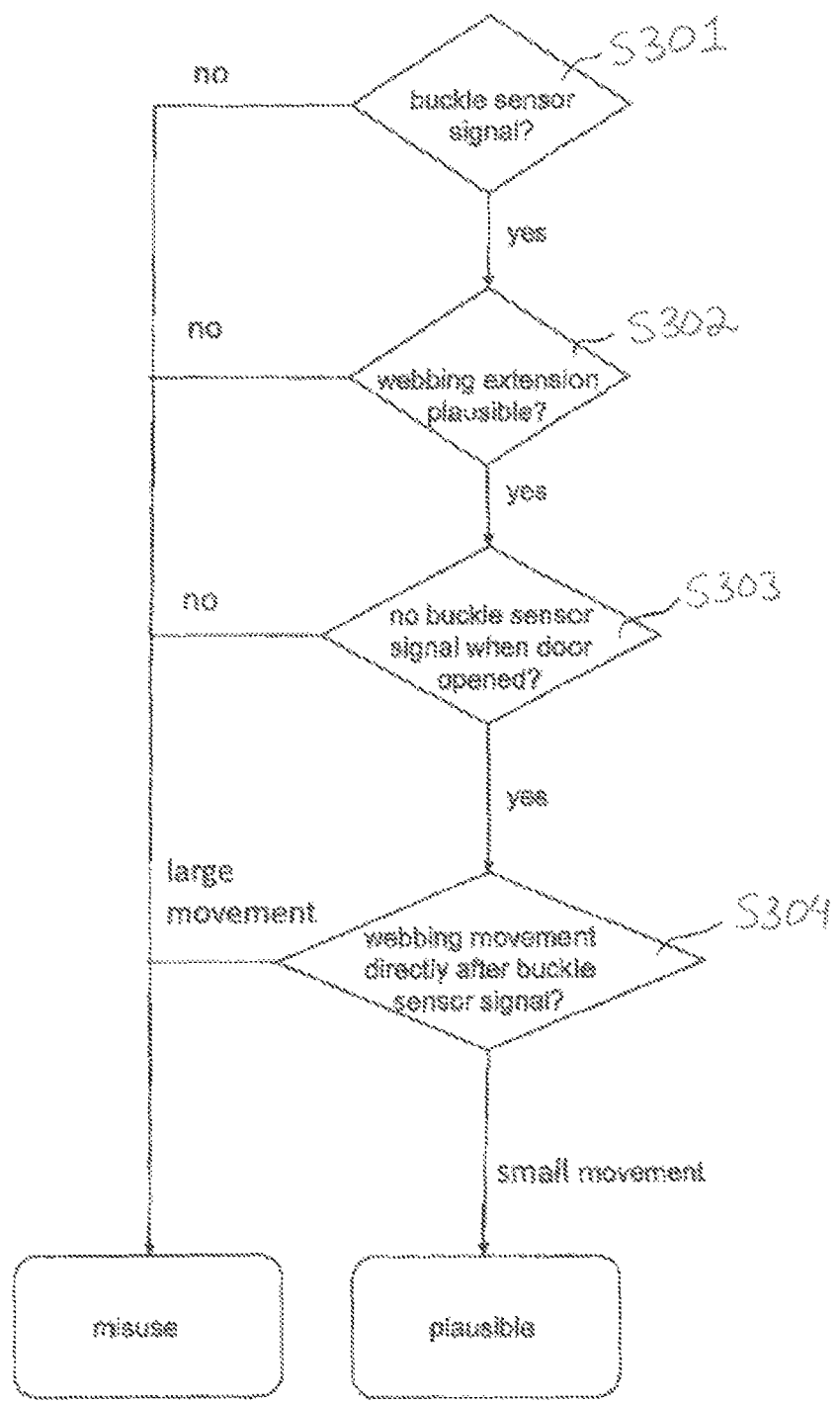
FIG. 3 shows a first example of an identification of misuse.
Figure 4:
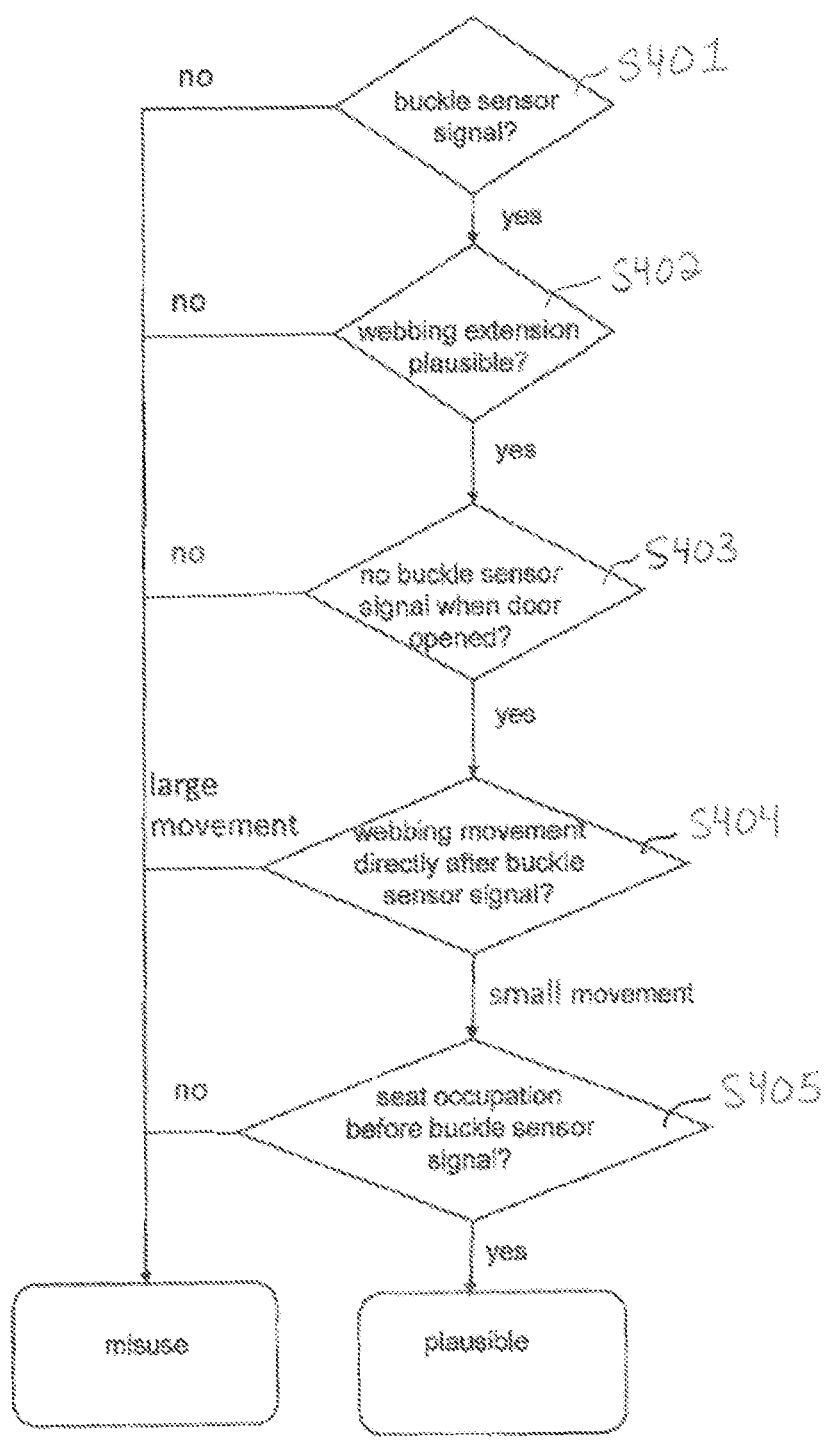
FIG. 4 shows a second example of an identification of misuse.
Figure 5:
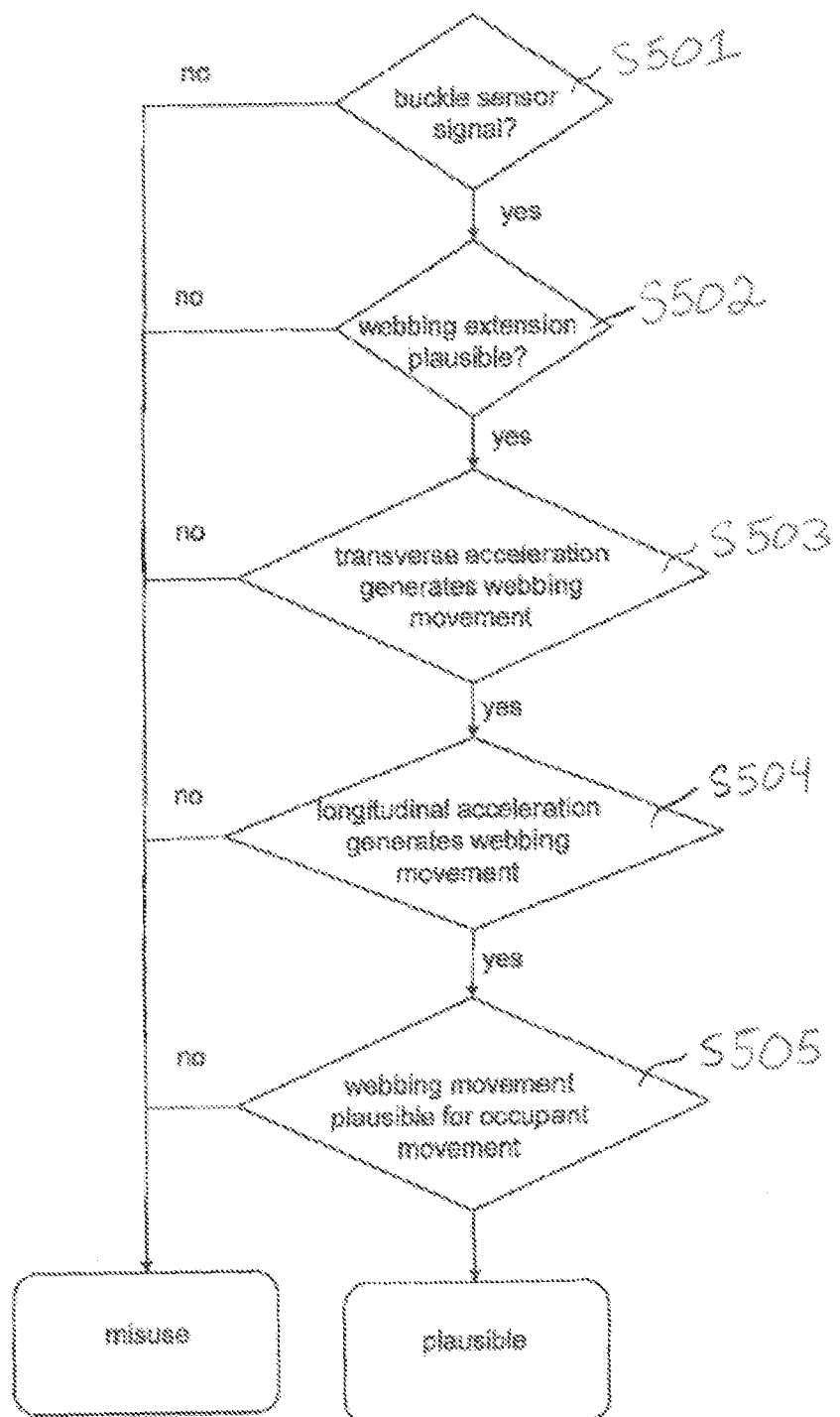
FIG. 5 shows a third example of an identification of misuse.

FIGS. 3 to 5 illustrate examples of inquiry schemes for identifying misuse.

FIGS. 3 and 4 especially illustrate examples of identifying whether the webbing was correctly fastened, i.e. a correct belt fastening operation was carried out.

On the one hand, it is checked whether the actual event order established from the input time of the sensor signals and vehicle data corresponds to a predetermined reference order. The reference order here is: "open door" and, resp., "close door" signal of the door sensor 14, webbing extension signal of webbing extension sensor 24, belt buckle sensor signal "plug-in tongue inserted" (step S303/S403).

Moreover, the webbing extension sensor 24 should report at most a small webbing movement directly following the belt buckle sensor signal (step S304/S404). A large movement indicates a misuse, whereas a small movement is plausible when the webbing tightly contacts the body immediately after buckling. In addition, it may be checked whether the webbing extension is plausible, i.e. for example whether a sufficient amount of webbing has been extended for buckling a vehicle occupant (step S302/S402).

Even if the belt buckle sensor signal reporting an inserted plug-in tongue is provided (step S301/S401) already together with the door sensor signal for opening or closing the door, a misuse can be concluded therefrom.

It may be additionally checked for the passenger seat, as shown in FIG. 4, whether the seat occupation sensor 28 has output a seat occupation before the input of a belt buckle sensor signal or whether allegedly first the plug-in tongue was inserted before the occupant sat down on the seat 26 (step S405).

Intended guiding of the webbing can be checked, for example, by the inquiry scheme of FIG. 5.

In this case, in addition to checking for a belt buckle sensor signal for an inserted plug-in tongue (step S501) and to checking whether the reported webbing extension is plausible (step S502), over a certain period of time in the traveling vehicle the transverse acceleration of the vehicle is correlated with the output sensor signals of the webbing extension sensor and the webbing movements occurring in transverse acceleration are measured and stored (step S503). This is also done for longitudinal accelerations of the vehicle, wherein both webbing output in vehicle decelerations and webbing retraction in positive vehicle accelerations are detected (step S504).

It is expected in both cases that an acceleration above a specific limit entails a webbing movement when inertia forces act on the vehicle occupant and the latter has guided the belt around the upper body part. In contrast, if the vehicle occupant sits on the belt or if the belt is not inserted at all and a cheating tongue is used, small webbing movements are expected at the very most. By comparing the webbing movements collected over a certain period of time or when checking for each individual acceleration event to reference values established before it can be checked during traveling whether the seat belt is correctly fastened.

Moreover, it is checked in this case whether the webbing movement is plausible to the vehicle occupant's own movements (step S505). Accordingly, webbing movements not correlated with vehicle accelerations are evaluated. A vehicle occupant is expected to move in the course of time, for example for operating the car radio, the shift lever or for opening the glove compartment, whereby webbing movements are taking place. In this example, too, a comparison is made with stored reference values established before. If the entire webbing movement is smaller than this limit, a misuse can be concluded.

The invention claimed is:

1. A method of identifying misuse of a seat belt in a vehicle in which vehicle data are detected and a plausibility check for misuse of the seat belt is performed for determining whether the seat belt is being misused based on the vehicle data, wherein the vehicle data comprise signals of at least one belt buckle sensor (20) and at least one webbing extension sensor (24), and wherein the plausibility check for misuse of the seat belt is performed by comparing at least one of a time course of the signals and a point in time of input of the signals with stored reference data to determine whether the seat belt is being misused, the time course of the signals being the succession of the signals detected in a predetermined time interval, the point in time of input of the signals being the point in time in which the signals are detected.

2. The method according to claim 1, wherein the vehicle data further comprise:
   signals of at least one seat occupation sensor (28);
   signals of at least one door sensor (14); and
   at least one of signals of at least one acceleration sensor (30) and signals of a speedometer (32).

3. The method according to claim 1, wherein the plausibility check for misuse of the seat belt further comprises checking whether a plug-in tongue of the seat belt is correctly inserted in an assigned belt buckle (18) and whether the webbing is guided as intended.

4. The method according to claim 1, wherein the signals from the sensors are stored and the stored sensor signals are assigned to events, and the plausibility check for misuse is further performed by comparing data related to the events with the stored reference data.

5. The method according to claim 4, wherein based on the point in time of input of the signals, a time order of the events is established and/or time intervals between the events are determined, and the plausibility check for misuse of the seat belt is further performed by comparing the time order of the events and/or the time intervals between the events with the stored reference data.

6. The method according to claim 5, wherein the vehicle data further comprise signals of at least one door sensor (14), the at least one door sensor outputting a "door opened" signal, the at least one belt buckle sensor (20) outputting a "plug-in tongue inserted" signal, and the webbing extension sensor (24) outputting a "webbing extension" signal, and wherein a misuse of the seat belt is concluded when the time order of the events deviates from a stored reference order of "door opened", "webbing extension", and "plug-in tongue inserted".

7. The method according to claim 4, wherein each of the signals of the sensors has a value, each of the values of the sensor signals being linked to a corresponding event when the sensor signals are assigned to events, and wherein the plausibility check for misuse is further performed by comparing the values linked to the events with stored reference parameter values.

8. The method according to claim 4, wherein the plausibility check for misuse of the seat belt is further performed by determining a time order of the events and comparing the time order of the events with a stored reference order.

9. The method according to claim 4, wherein the only events that are taken into account are events which occur before a predetermined event or a combination of events.

10. The method according to claim 9, wherein the combination of events are a combination of a signal of the belt buckle sensor (20) indicating an insertion of a plug-in tongue into a belt buckle and a signal of a speedometer (32) indicating that the vehicle is exceeding a predetermined limit speed for driving without a fastening of the seat belt.

11. The method according to claim 1, wherein the signals from the webbing extension sensor (24) include a length that a webbing of the seat belt is extended, and the vehicle data further comprises signals of at least one acceleration sensor (30), and wherein a misuse of the seat belt is concluded when the webbing of the seat belt is at least one of not extended and only extended a small length when a transverse vehicle acceleration and/or vehicle deceleration is detected by the least one acceleration sensor (30).

12. The method according to claim 1, wherein a misuse of the seat belt is concluded when webbing movements of the seat belt which do not correlate with vehicle acceleration events deviate from a stored reference value while the vehicle is at a vehicle speed other than zero for a predetermined period of time, the webbing movements being at least one of a webbing extension and a webbing retraction detected by the webbing extension sensor (24).

13. A seat belt system in a vehicle for carrying out a method according to claim 1, comprising the at least one belt buckle sensor (20), the at least one webbing extension sensor (24), and at least one of at least one seat occupation sensor (28), a door sensor (14), a vehicle acceleration sensor (30), and a vehicle speedometer (32), the seat belt system further comprising a control unit (16) in which signals outputted from the sensors are stored and evaluated.

14. The seat belt system according to claim 13, including at least one plug-in tongue having a coding which corresponds to one single belt buckle (18) of the vehicle, the coding being designed so that the plug-in tongue is capable of being locked only into the corresponding belt buckle (18).

15. A method of identifying misuse of a seat belt in a vehicle, comprising:
    detecting signals of at least one belt buckle sensor (20) and at least one webbing extension sensor (24);
    determining at least one of
      a time course of the detected signals, the time course of the signals being the succession of the signals detected in a predetermined time interval, and
      a point in time of input of the detected signals, the point in time of input of the signals being the point in time in which the signals are detected; and
    performing a plausibility check for misuse of the seat belt by comparing at least one of the time course of the signals and the point in time of input of the signals with stored reference data to determine whether the seat belt is being misused.

16. The method according to claim 15, further comprising:
    detecting signals of at least one seat occupation sensor (28);
    detecting signals of at least one door sensor (14); and
    detecting at least one of signals of at least one acceleration sensor (30) and signals of a speedometer (32).

17. The method according to claim 15, wherein the plausibility check for misuse of the seat belt is further performed by checking whether a plug-in tongue of the seat belt is correctly inserted in an assigned belt buckle (18) and whether a webbing of the seat belt is guided as intended.

18. The method according to claim 15, wherein the signals from the webbing extension sensor (24) include a length a webbing of the seat belt is extended, the method further comprising:
    detecting signals of at least one acceleration sensor (30);
    wherein the plausibility check for misuse of the seat belt is further performed by evaluating the length the webbing the seat belt is extended when a transverse vehicle acceleration and/or vehicle deceleration is detected by the at least one acceleration sensor (30); and wherein the plausibility check for misuse of the seat belt concludes that the seat belt is being misused when the webbing of the seat belt is at least one of not extended and only extended a small length when a transverse vehicle acceleration and/or vehicle deceleration is detected by the least one acceleration sensor (30).

19. The method according to claim 15, further comprising:

detecting webbing movements of the seat belt with the webbing extension sensor (24), the webbing movements being at least one of a webbing extension and a webbing retraction of a webbing of the seat belt;

wherein the plausibility check for misuse is further performed by comparing the webbing movements of the seat belt which do not correlate with vehicle acceleration events with a stored reference value while the vehicle is at a vehicle speed other than zero for a predetermined period of time; and wherein the plausibility check for misuse of the seat belt concludes that the seat belt is being misused when the webbing movements of the seat belt which do not correlate with vehicle acceleration events deviate from the stored reference value while the vehicle is at a vehicle speed other than zero for a predetermined period of time.

20. A method of identifying misuse of a seat belt in a vehicle, comprising:

detecting signals of at least one belt buckle sensor (20) and at least one webbing extension sensor (24);

storing the signals from the sensors;

assigning the stored sensor signals to events;

determining a time order of the events;

determining at least one of
 a time course of the detected signals, the time course of the signals being the succession of the signals detected in a predetermined time interval, and
 a point in time of input of the detected signals, the point in time of input of the signals being the point in time in which the signals are detected; and performing a plausibility check for misuse of the seat belt by comparing the time order of the events with a stored referenced order and by comparing at least one of the time course of the signals and the point in time of input of the signals with stored reference data to determine whether the seat belt is being misused.

* * * * *